United States Patent
Tanaka et al.

(10) Patent No.: US 7,412,323 B2
(45) Date of Patent: Aug. 12, 2008

(54) VARIABLE VALVE TIMING CONTROLLER FOR INTERNAL COMBUSTION ENGINE

(75) Inventors: Toshikazu Tanaka, Kariya (JP); Masaomi Inoue, Kariya (JP); Yuuichi Takemura, Anjo (JP); Zenichiro Mashiki, Nissin (JP)

(73) Assignees: Denso Corporation (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 11/896,122

(22) Filed: Aug. 29, 2007

(65) Prior Publication Data
US 2008/0065308 A1 Mar. 13, 2008

(30) Foreign Application Priority Data
Aug. 30, 2006 (JP) ............................. 2006-233283

(51) Int. Cl.
*F02D 13/02* (2006.01)
*F01L 1/34* (2006.01)

(52) U.S. Cl. .................................. 701/104; 123/90.17

(58) Field of Classification Search ................. 701/114, 701/102; 123/90.15, 90.17
See application file for complete search history.

(56) References Cited

U.S. PATENT DOCUMENTS

| | | | | |
|---|---|---|---|---|
| 6,953,013 | B2 * | 10/2005 | Tani | 123/90.17 |
| 7,243,627 | B2 * | 7/2007 | Izumi et al. | 123/90.17 |
| 7,308,877 | B2 * | 12/2007 | Izumi et al. | 123/90.17 |
| 2006/0042579 | A1 | 3/2006 | Izumi et al. | |

FOREIGN PATENT DOCUMENTS

JP 2007-239593 A * 9/2007

* cited by examiner

*Primary Examiner*—Hieu T Vo
(74) *Attorney, Agent, or Firm*—Nixon & Vanderhye PC

(57) ABSTRACT

A motor current is estimated based on a target motor speed, an actual motor speed, and an engine speed. When the estimated motor current exceeds a predetermined value equivalent to a heat limiting current value, a variation (motor speed F/B amount) of the target motor speed outputted to an EDU from an ECU is restricted so that the motor current was restricted and heat generation in motor is restricted. In consideration of a deterioration of responsivity of the variable valve timing control due to restriction of the motor current during execution of motor current restriction processing, an existence of the abnormalities of variable valve timing controller is determined based on a deviation of the target camshaft phase and the actual camshaft phase.

9 Claims, 9 Drawing Sheets ically shows a whole structure of an engine control system. An internal combustion engine 11, which is referred to as an engine hereinafter, includes a crankshaft 12. A driving force of the crankshaft 12 is transmitted to an intake camshaft 16 and an exhaust camshaft 17 through a timing chain 13 (or a timing belt) and sprockets 14, 15. A variable valve timing controller 18, which includes an electric motor, is coupled to the intake cam shaft 16. The variable valve timing controller 18 varies a rotational phase (camshaft
VARIABLE VALVE TIMING CONTROLLER FOR INTERNAL COMBUSTION ENGINE

CROSS-REFERENCE TO RELATED APPLICATION

This application is based on Japanese Patent Application No. 2006-233283 filed on Aug. 30, 2006, the disclosure of which is incorporated herein by reference.

FIELD OF THE INVENTION

The present invention relates to a variable valve timing controller which includes an electric motor as a driving source. A rotation speed of the electric motor is varied to adjust a rotational phase of the camshaft relative to a crankshaft, whereby a valve timing of an intake valve and/or an exhaust valve of an internal combustion engine is adjusted.

BACKGROUND OF THE INVENTION

In order to perform electronic control of the variable valve timing control, the variable valve timing controller which has the motor as a source of the drive has been developed. The variable valve timing controller described in JP-2006-70754A (US2006/0042578A1) includes a first gear, a second gear, a phase changing gear, and an electric motor. The first gear (outer gear) is concentrically arranged with the camshaft and is rotated with the rotation driving force of the crankshaft. The second gear (inner gear) rotates together with the camshaft. The phase changing gear (planet gear) transmits the torque of the first gear to the second gear, and varies the rotational phase of the second gear relative to the first gear. The motor is coaxially provided to the camshaft so that the revolution speed of the phase changing gear is controlled. The number of teeth of the first gear, the second gear, and the phase changing gear is determined so that the camshaft may rotate with one half of the rotational speed of the rotational speed of the crankshaft.

In the above motor drive variable valve timing controller, as a driving current of the motor ("motor current") increases during the variable valve timing control, the heat value of the motor increases and a coil temperature rises. When the transient operating condition in which a target motor speed (target valve timing) changes frequently continues, a coil temperature of the motor may exceed an allowable temperature and will cause durability deterioration and malfunction of the motor.

In order to solve the above matters, the present inventors has developed a variable valve timing controller which is able to restrict a motor current so that generated heat does not exceed a specified permissible value. In such a valve timing controller, a new diagnosis technology is needed.

SUMMARY OF THE INVENTION

The present invention is made in view of the above matters, and it is an object of the present invention to provide a variable valve timing controller adjusting valve timing by use of an electric motor, which is able to restrict an excessive temperature rising of a motor coil and is able to perform diagnosis.

According to the present invention, the variable valve timing controller includes a target motor speed computing means for computing a target motor speed based on a rotation speed of the internal combustion engine and a deviation between a target camshaft phase and an actual camshaft phase. The controller includes a motor drive means for controlling the driving current of the motor to decrease the deviation between the target motor speed and the actual motor speed. The controller further includes a motor current estimating means for estimating the motor current, a motor current restricting means for restricting the motor current when the motor current estimated by the motor current estimating means exceeds an upper limit value, and an abnormality-diagnosis means for determining whether an abnormality exists based on a deviation between the target camshaft phase and the actual camshaft phase in consideration of a deterioration of responsivity of the variable valve timing control due to a restriction of the motor current by the motor current restricting means.

Hence, the heat value of motor may not exceed the heat generation limit, and it can be prevented that the coil temperature of motor exceeds the allowable temperature range. The durability deterioration and failure of motor can be prevented.

In this case, when the motor current is restricted, the speed of response of the variable valve timing control becomes slow. The abnormality-diagnosis means determines whether an abnormality exists based on the deviation between the target camshaft phase and the actual camshaft phase in consideration of a deterioration of responsivity of the variable valve timing control due to a restriction of the motor current by the motor current restricting means. Therefore, the abnormality diagnosis of variable valve timing controller can be performed with sufficient accuracy during execution of motor current restriction processing, and the abnormality can be detected at an early stage.

DETAILED DESCRIPTION OF THE PREFERRED EMBODIMENTS

Figure 1:
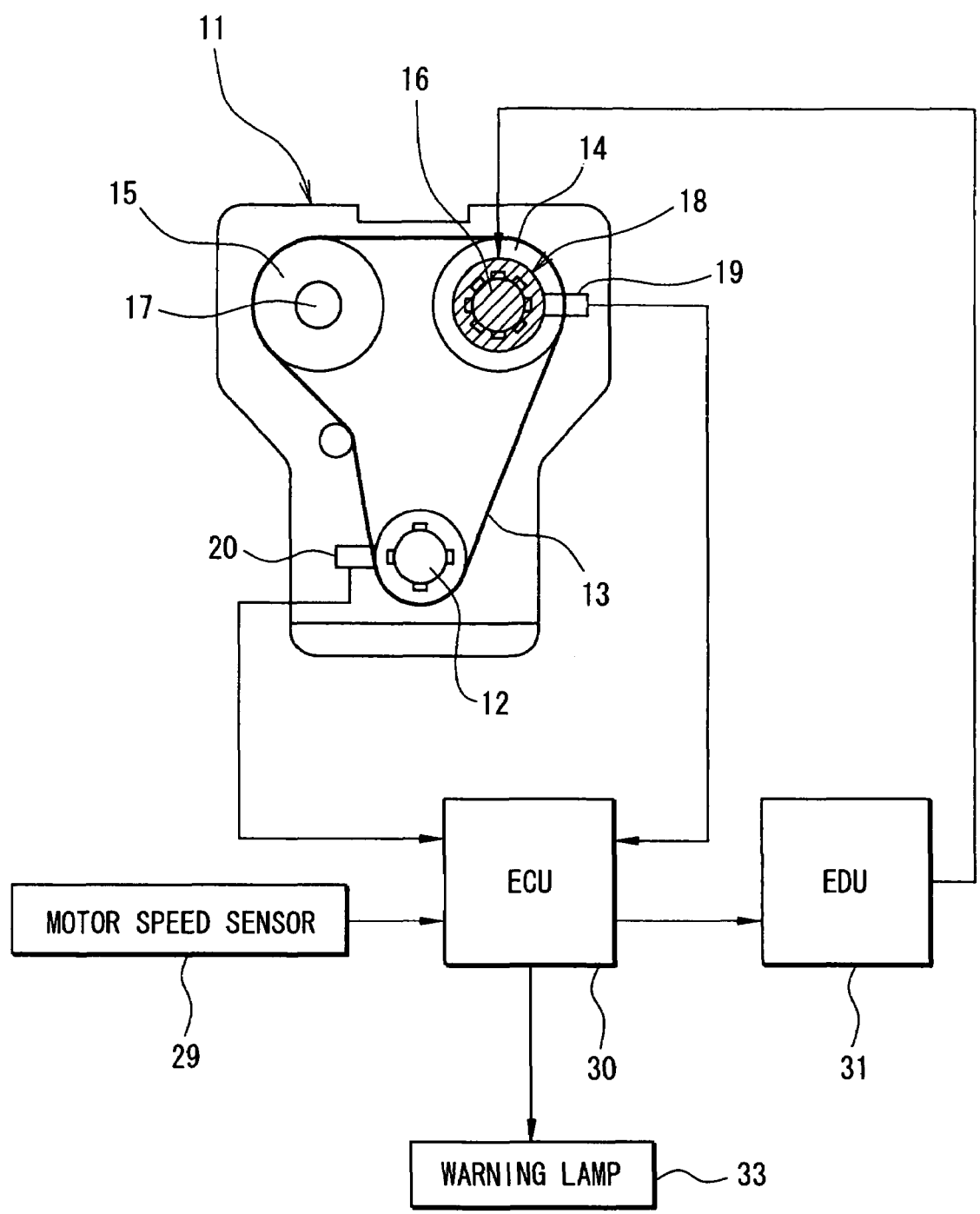
FIG. 1 is a schematic view showing an engine control system according to an embodiment of the present invention.

An embodiment of the present invention will be described hereinafter. FIG. 1 schematically shows a whole structure of an engine control system. An internal combustion engine 11, which is referred to as an engine hereinafter, includes a crankshaft 12. A driving force of the crankshaft 12 is transmitted to an intake camshaft 16 and an exhaust camshaft 17 through a timing chain 13 (or a timing belt) and sprockets 14, 15. A variable valve timing controller 18, which includes an electric motor, is coupled to the intake cam shaft 16. The variable valve timing controller 18 varies a rotational phase (camshaft phase) of the intake camshaft 16 relative to the crankshaft 12 so that the valve timing of an intake vale (not shown) is adjusted.

A cam angle sensor 19 is provided around the intake camshaft 16. The cam angle sensor 19 outputs a cam angle signal every predetermined cam angle of the intake camshaft 16. A crank angle sensor 20 is provided around the cranks shaft 12. The crank angle sensor 20 outputs a crank angle signal every predetermined crank angle.

Figure 2:
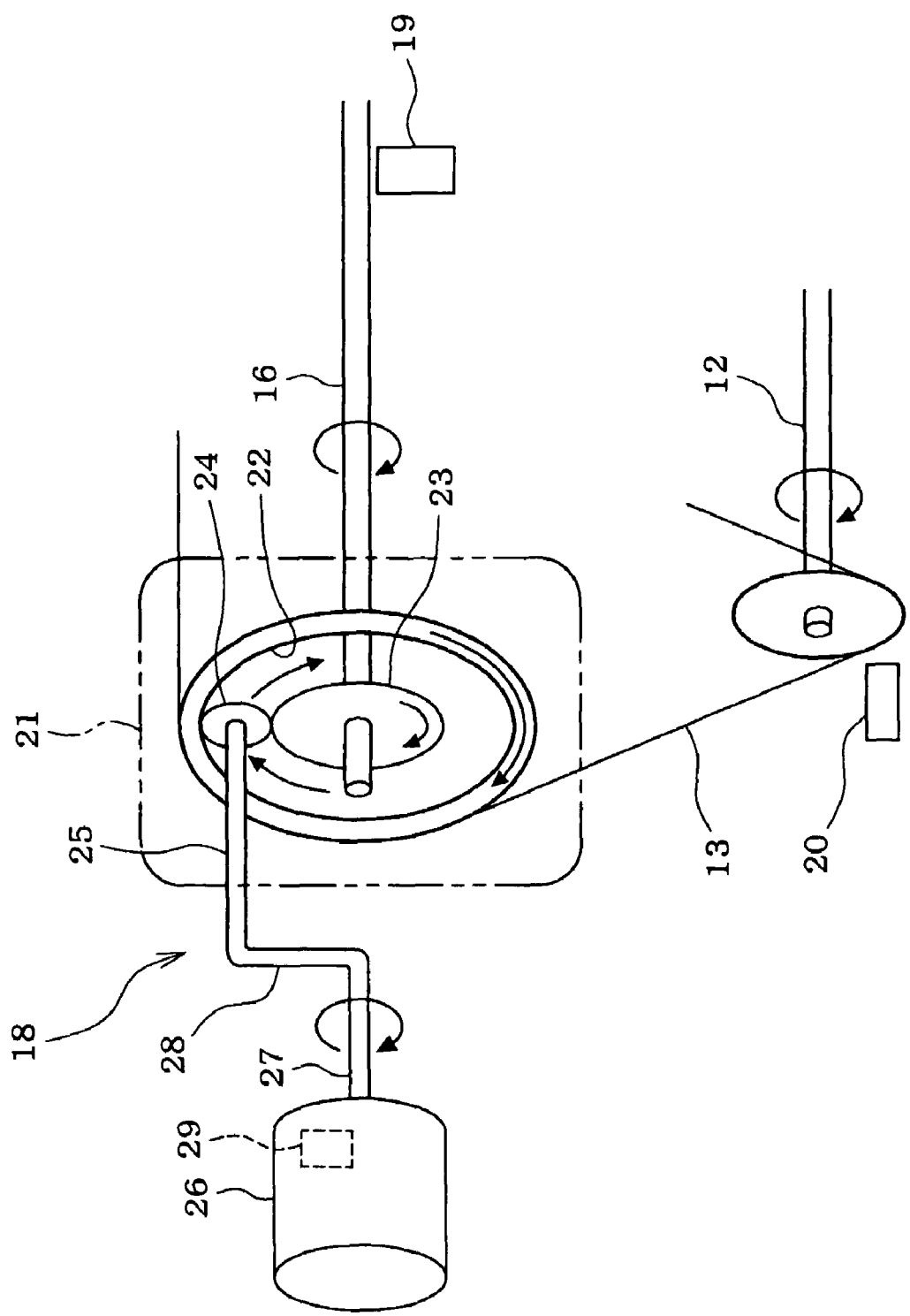
FIG. 2 is a schematic view showing a variable valve timing controller.

Referring to FIG. 2, a structure of the variable valve timing controller 18 is described. The variable valve timing controller 18 includes a phase control mechanism 21. The phase control mechanism 21 includes an outer gear 22 (a first gear), an inner gear 23 (a second gear), and a planet gear 24 (a phase changing gear). The outer gear 22 is concentrically arranged with the intake camshaft 16 and has inner teeth. The inner gear 23 is concentrically arranged with the outer gear 22 and has outer teeth. The planet gear 24 is arranged between the outer gear 22 and the inner gear 23 to be engaged with both gears 22, 23. The outer gear 22 rotates integrally with the sprocket 14 which rotates in synchronization with the crankshaft 12, and the inner gear 23 rotates integrally with the intake camshaft 16. Engaging with the outer gear 22 and the inner gear 23, the planet gear 24 rotates around the inner gear 23 to transfer a rotation force from the outer gear 22 to the inner gear 23. A rotational phase of the inner gear 23 (camshaft phase) relative to the outer gear 22 is adjusted by varying a revolution speed of the planet gear 24 relative to the rotation speed of the inner gear 23.

The number of teeth of the outer gear 22, the inner gear 23 and the planet gear 24 are determined in such a manner that the intake camshaft 16 rotates in a half speed of the crankshaft 12.

Rotational speed of the intake camshaft 16=Rotational speed of the crankshaft 12×½

The engine 11 is provided with a motor 26 which varies the revolution speed of the planet gear 24. A rotation shaft 27 of the motor 26 is concentrically arranged with the intake camshaft 16, the outer gear 22, and the inner gear 23. A connecting shaft 28 connects the rotation shaft 27 with a supporting shaft 25 of the planet gear 24. When the motor 26 is energized, the planet gear 24 rotates on the supporting shaft 25 and orbits around the inner gear 23. Besides, the motor 26 is provided with a motor speed sensor 29 which outputs a rotational motor speed signal.

When the motor 26 is not energized, the rotation shaft 27 rotates in synchronization with the intake camshaft 16. That is, when the rotation speed RM of the motor 26 is consistent with the rotation speed RC of the intake camshaft 16, and the revolution speed of the planet gear 24 is consistent with the rotational speed of the inner gear 23, a difference between a rotational phase of the outer gear 22 and a rotational phase of the inner gear 23 is maintained as a current difference to maintain the valve timing (camshaft phase) as the current valve timing.

When the rotation speed RM of the motor 26 is made higher than the rotational speed RC of the intake camshaft 16, that is, when the revolution speed of the planet gear 24 is made higher than the rotational speed of the inner gear 23, the rotational phase of the inner gear 23 relative to the outer gear 22 is advanced so that the valve timing of the intake valve is advanced. Thereby, the rotational phase of the inner gear 23 relative to the outer gear 22 is advanced, and the valve timing (camshaft phase) is advanced.

When the rotation speed RM of the motor 26 is made lower than the rotational speed RC of the intake camshaft 16, that is, when the revolution speed of the planet gear 24 is made lower than the rotational speed of the inner gear 23, the rotational phase of the inner gear 23 relative to the outer gear 22 is retarded so that the valve timing of the intake valve is retarded.

The outputs of the sensors are inputted into an electronic control unit 30, which is referred to as an ECU 30 hereinafter. The ECU 30 includes a microcomputer which executes engine control programs stored in a ROM (read only memory) to control a fuel injection and an ignition timing according to an engine driving condition.

Figure 3:
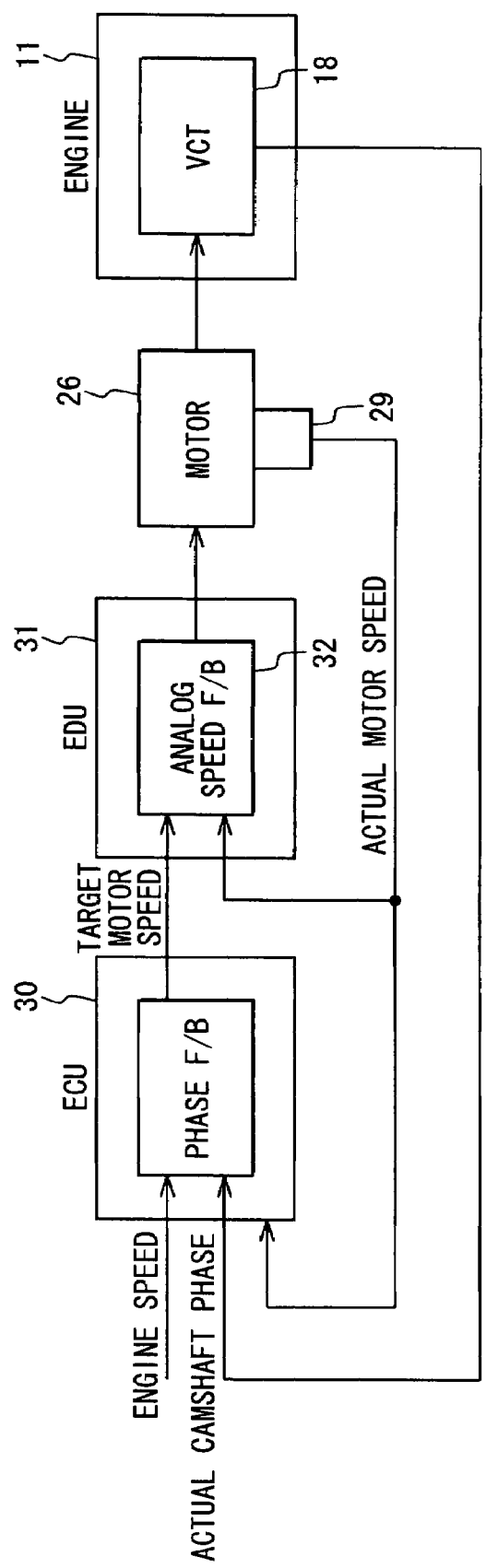
FIG. 3 is a block diagram showing the structure of the control system of the variable valve timing controller.

Moreover, the ECU 30 calculates a rotational phase (actual camshaft phase) of the camshaft 16 relative to the crankshaft 12 based on the output of the cam angle sensor 19 and the crank angle sensor 20. The ECU 30 calculates the target camshaft phase (target valve timing) according to an engine operating conditions. The ECU 30 calculates the target motor speed based on the engine speed and a deviation between the target camshaft phase and the actual camshaft phase. And as shown in FIG. 3, the ECU 30 outputs the signal indicative of the target motor speed toward the motor drive circuit (EDU) 31.

The EDU 31 performs a motor drive control. The EDU 31 has an analog rotating-speed feedback circuit 32 which performs feedback control of the duty of the voltage applied to the motor 26 so that the deviation of the target motor speed and an actual motor speed is decreased. The EDU 31 performs a feedback control of the actual motor speed to the target motor speed, and performs a feedback control of the actual camshaft phase to the target camshaft phase. "Feedback" is expressed as "F/B" in the following description.

Figure 4:
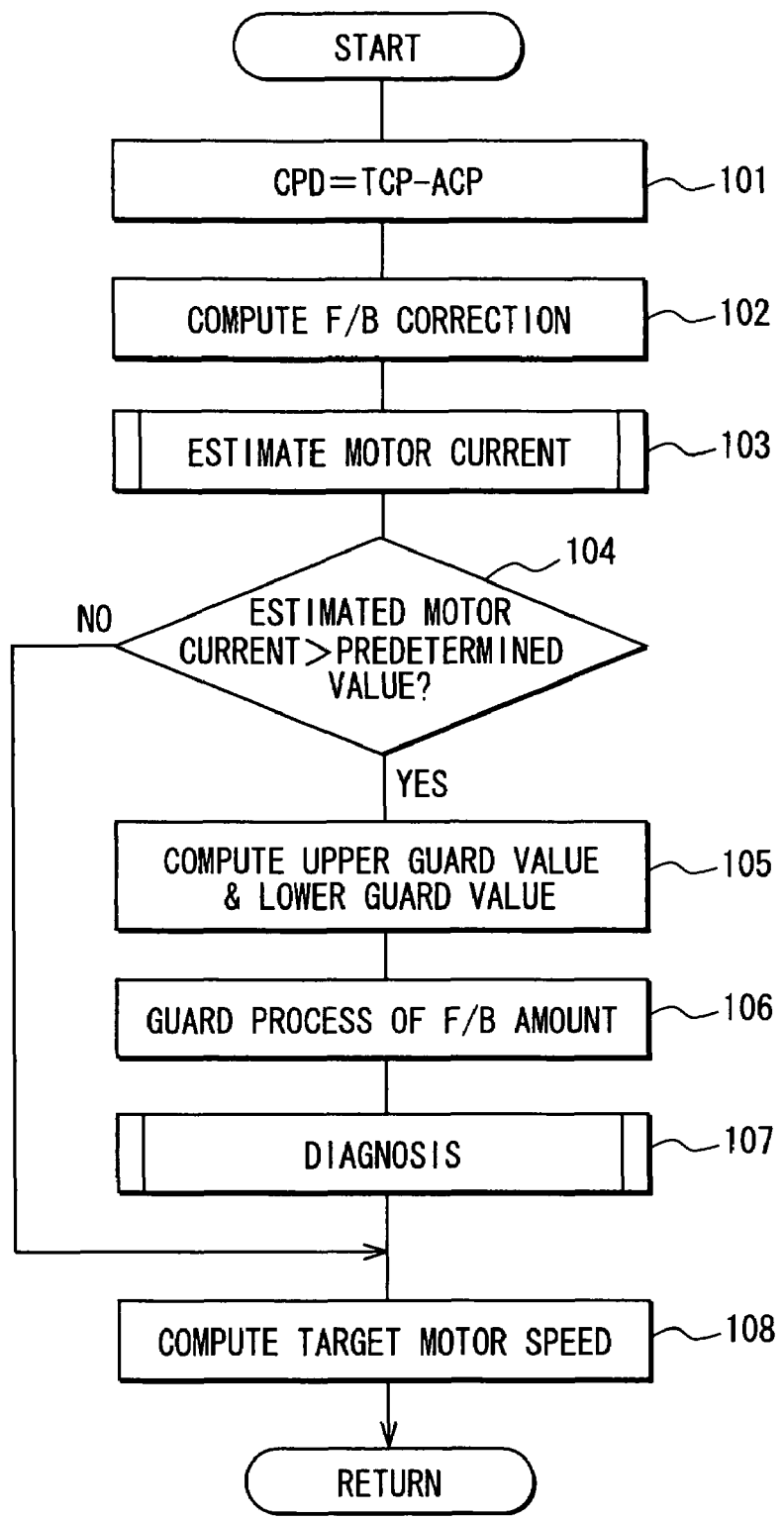
FIG. 4 is a flow chart showing a processing of the target motor speed operation program.
Figure 5:
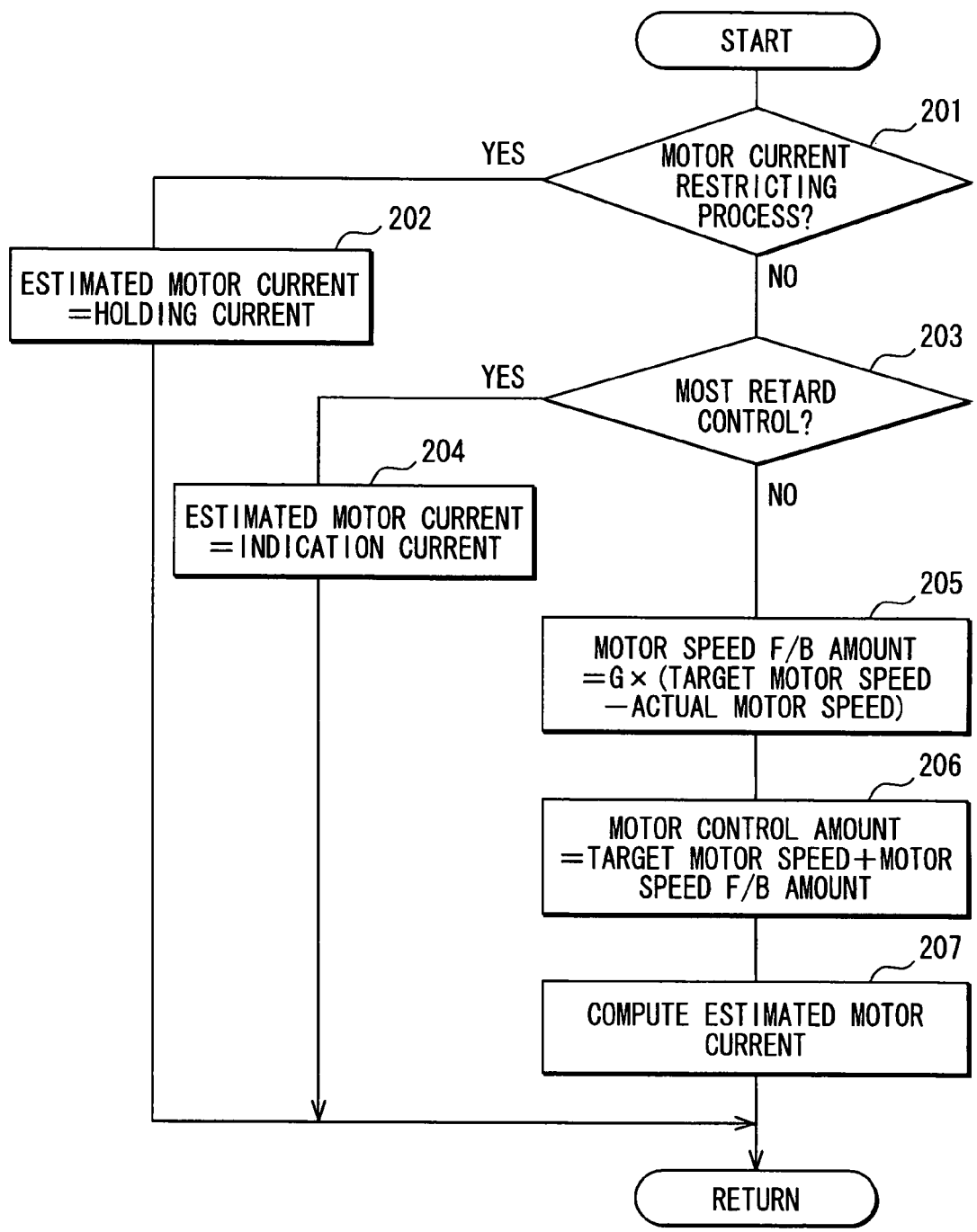
FIG. 5 is a flow chart showing a processing of the motor current estimation program.

The ECU 30 is executing each program shown in FIGS. 4 and 5 during the engine operation. A motor current (driving current of motor) is estimated based on a target motor speed, an actual motor speed, and an engine speed. When the estimated motor current exceeds a predetermined value equivalent to a heat generation limiting current, the ECU 30 restricts a variation in target motor speed to be outputted to the EDU 31. This variation corresponds to a motor speed F/B amount.

Figure 6:
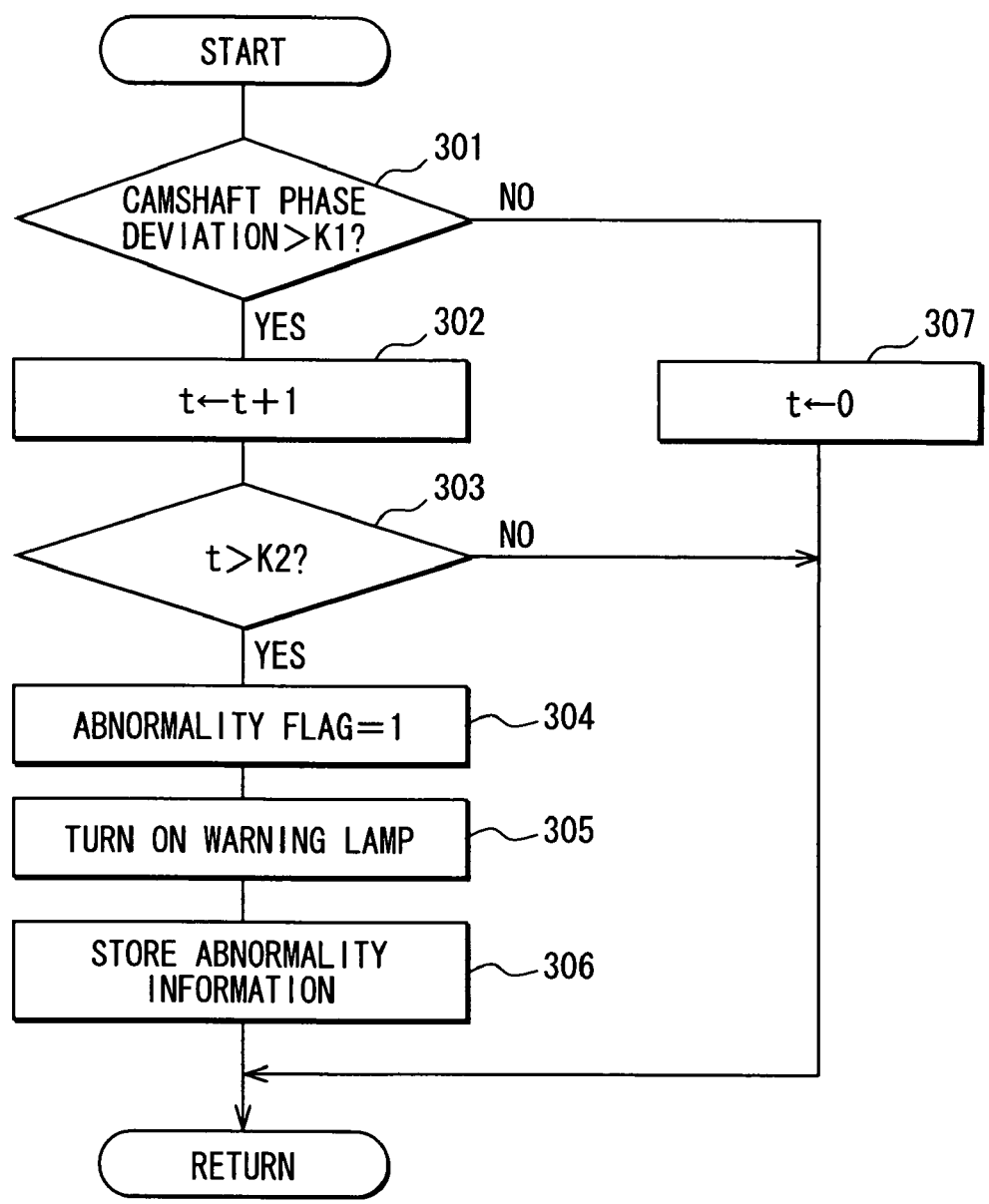
FIG. 6 is a flow chart showing a processing of a diagnosis program.

The ECU 30 is executing the abnormality-diagnosis program shown in FIG. 6. In consideration of a deterioration of responsivity of the variable valve timing control due to restriction of the motor current during execution of motor current restriction processing, the existence of the abnormalities of variable valve timing controller 18 is determined based on the deviation of the target camshaft phase and the actual camshaft phase. When it is determined that the abnormalities exist, a warning lamp 33 is turned on (or blink), or a warning sign is indicated in an instrument panel.

Hereafter, the processing of each program of FIGS. 4 to 6 which the ECU 30 executes is explained.

[Target Motor Speed Computation Program]

The ECU 30 executes the target motor speed computation program shown in FIG. 4 during the engine operation.

In step 101, a deviation between the target camshaft phase and the actual camshaft phase is computed. This deviation is referred to as the camshaft phase deviation.

Camshaft phase deviation (CPD)=Target camshaft phase (TCP)−Actual camshaft phase (ACP)

Figure 7:
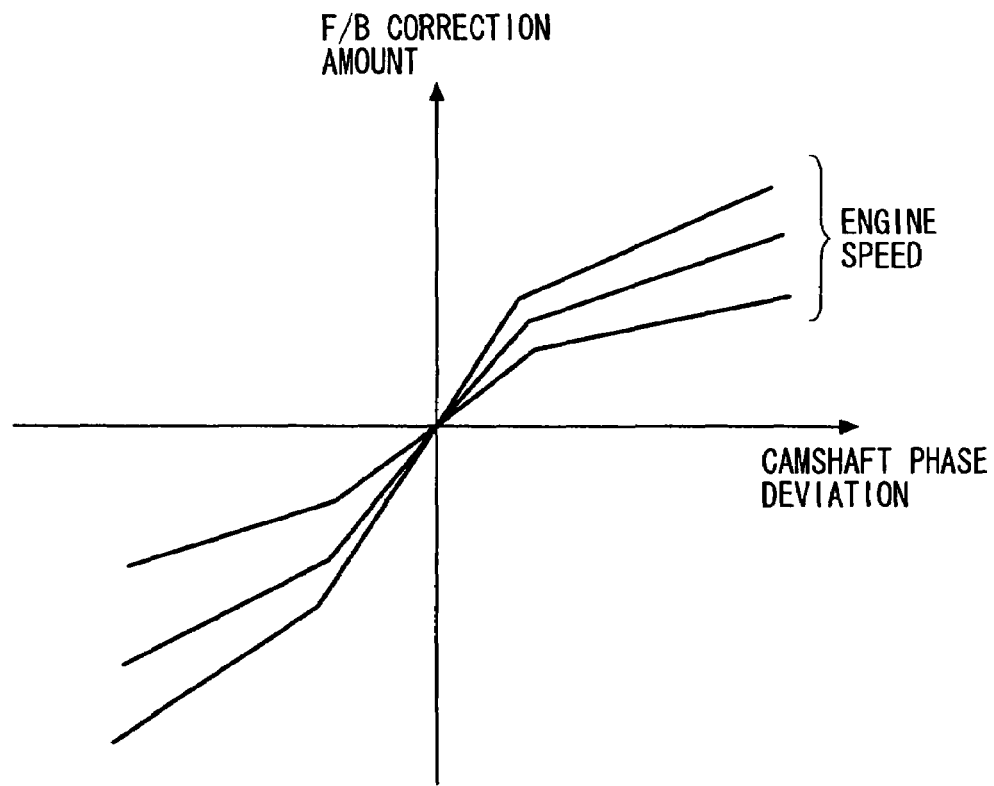
FIG. 7 is a chart schematically showing a motor speed F/B amount map.

Then, the procedure proceeds to step 102 in which the rotational speed F/B correction amount according to present engine speed and camshaft phase deviation is computed with reference to the motor speed F/B correction amount map shown in FIG. 7. As shown in the motor speed FIB correction amount map of FIG. 7, as camshaft phase deviation (CPD)

increases, the motor speed FIB correction amount increases, and as the engine speed increases, the motor speed F/B correction amount increases.

After computing the rotational speed F/B correction amount, the procedure proceeds to step 103 in which a motor current estimation program shown in FIG. 5 is executed. In step 103, the estimated motor current is computed based on the instant target motor speed and the instant actual motor speed. Then, the procedure proceeds to step 104 in which it is determined whether the estimated motor current exceeds a predetermined value equivalent to the heat generation limiting current value. When the answer is No in step 104, the procedure proceeds to step 108 in which the target motor speed is established based on the following equation without restricting the motor speed F/B correction amount computed in step 102.

Target motor speed (*TMS*)=Base target motor speed (*BTMS*)+Motor speed F/B correction amount (*MSFBC*)

Here, the base target motor speed is the motor speed which is in agreement with the camshaft rotational speed (crankshaft rotation speed×½).

Figure 8:
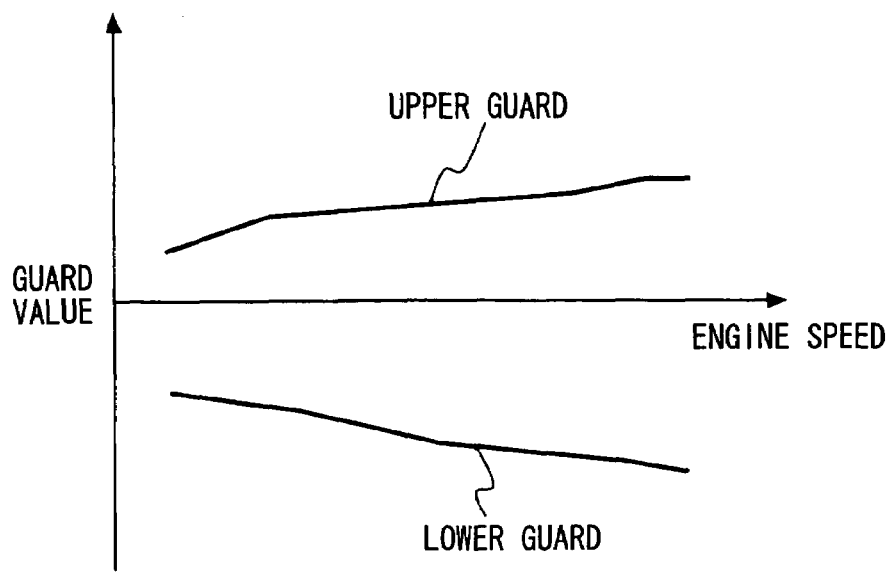
FIG. 8 is a chart schematically showing an upper and lower guard value map.

When the answer is Yes in step 104, the procedure proceeds to step 105 in which an upper guard value and a lower guard value are computed based on the instant engine speed according to a upper-lower guard value map shown in FIG. 8. As shown in FIG. 8, as the engine speed increases, absolute values of the upper guard value and the lower guard value increase. The upper guard value and the lower guard value may be established according to the engine speed and the camshaft phase deviation. For simplification of data processing, the guard values may be alternatively established as predetermined constant values.

Then, the procedure proceeds to step 106 in which the motor speed F/B amount computed in step 102 is guard-processed by using of the upper and lower guard values computed in step 105. That is, in a case that the motor speed F/B correction amount is greater than the upper guard value, the motor speed F/B correction amount is brought to the upper guard value. In a case that the motor speed F/B correction amount is less than the lower guard value, the motor speed F/B correction amount is brought to the lower guard value. In a case that the motor speed F/B correction amount is within a range between the upper guard value and the lower guard value, the motor speed F/B correction amount is not changed. In steps 104, 105 and 106, electric current applied to the motor is restricted.

Then, the procedure proceeds to step 107 in which the abnormality-diagnosis program is executed. In consideration of a deterioration of responsivity of the variable valve timing control due to restriction of the motor current during execution of motor current restriction processing, the existence of the abnormalities of variable valve timing controller 18 is determined based on the deviation of the target camshaft phase and the actual camshaft phase.

Then, the procedure proceeds to step 108 in which the target motor speed is computed by using of the guard processed motor speed F/B correction amount.

Target motor speed (*TMS*)=Base target motor speed (*BTMS*)+Guard-processed motor speed *F/B* correction amount (*G-MSFBC*)

The ECU 30 outputs the signal indicative of the target motor speed calculated by the above process toward the EDU 31.

[Motor Current Estimation Program]

The motor current estimation program shown in FIG. 5 is a subroutine performed in step 103 of FIG. 4. In step 201, it is determined whether a motor current restricting process (motor speed F/B correction amount guard) is executed. In the motor current restricting process, a holding current (motor current based on a holding duty) is set as an estimated motor current in step 202.

When the answer is No, the procedure proceeds to step 203 in which it is determined whether a most retard control is executed. In the most retard control, the camshaft phase is fixed at the most retarded phase (reference phase). When the answer is Yes in step 203, the procedure proceeds to step 204 in which an indication current is set as an estimation motor current. The indication current is a motor current which is determined based on an indication duty at the most retard control.

Meanwhile, when the answer is No in step 203, the procedure proceeds to step 205 in which the deviation between the target motor speed and the actual motor speed is multiplied by a F/B gain G to obtain the motor speed F/B amount.

Motor speed *F/B* amount=*G*×(Target motor speed−Actual motor speed)

Then, the procedure proceeds to step 206 in which the motor speed F/B amount computed in step 205 is added to the target motor speed to obtain a motor control mount.

Motor control amount=Target motor speed+Motor speed *F/B* amount

Figure 9:
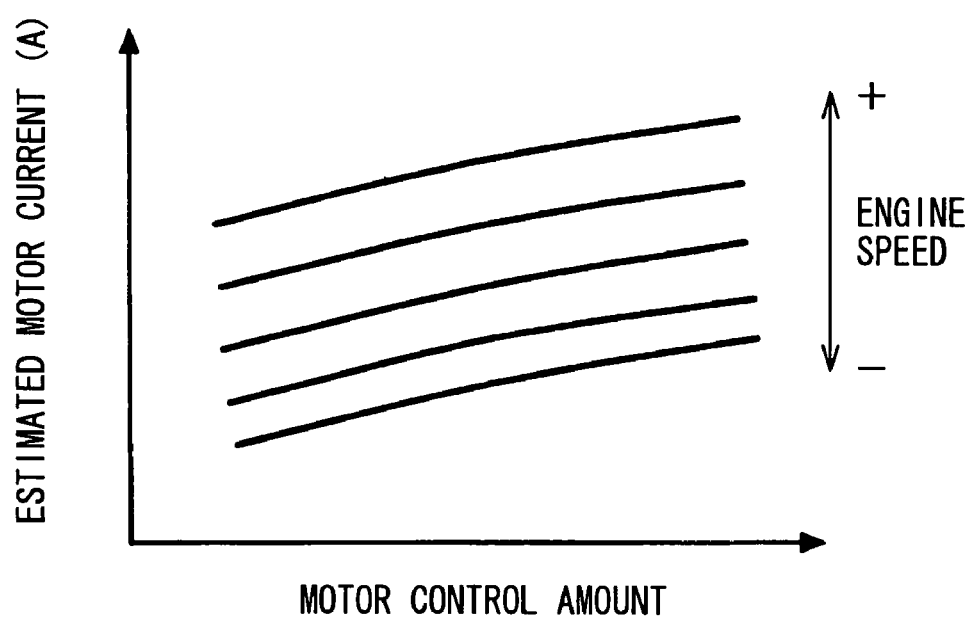
FIG. 9 is a chart schematically showing an estimated motor current map.

Then, the procedure proceeds to step 207 in which the instant motor control amount and the estimated motor current according to the engine speed are computed with reference to an estimated motor current map shown in FIG. 9. In the estimated motor current map of FIG. 9, as the motor control amount increases, the estimated motor current increases, and as the engine speed increases, the estimated motor current increases. Besides, the estimated motor current may be computed only based on the motor control amount.

Besides, the estimated motor current may be computed based on a map which has the target motor speed, the actual motor speed, and the engine speed as parameters. Alternatively, the estimated motor current may be computed based on a map which has the target motor speed and the actual motor speed as parameters. The estimated motor current may be computed by taking into consideration the parameters (for example, battery voltage, camshaft phase deviation) other than the above.

[Abnormality-diagnosis Program]

The abnormality-diagnosis program shown in FIG. 6 is a subroutine performed at step 107 of the target motor speed computation program shown in FIG. 4. In step 301, it is determined whether the deviation (camshaft phase deviation) between the target camshaft phase and the actual camshaft phase is larger than a specified value K1 (for example, 5° CA). When the answer is No in step 301, the procedure proceeds to step 307. In step 307, an elapsed time counter t which counts time period where the camshaft phase deviation is larger than the specified value K1 is reset to 0, and the procedure ends.

When the answer is Yes in step 301, the procedure proceeds to step 302 in which the elapsed time counter t counts the time period where the camshaft phase deviation is larger than the specified value K1. Then, the procedure proceeds to step 303 in which it is determined whether the time period counted by the counter t exceeds a specified value K2. Based on this result, it is determined whether abnormality exists. Considering a deterioration of the responsivity of the variable valve timing control, the specified value K2 is established relatively longer.

When the answer is No in step 303, the procedure ends. When the time period counted by the counter t exceeds the specified value K2, the procedure proceeds to step 304 in which an abnormality flag is turned to "1". Then, the procedure proceeds to step 305 in which the warning lamp 33 is turned on (or blink), or the warning sign is indicated in an instrument panel. In step 306, abnormality information is stored in a rewritable nonvolatile memory (not shown), such as a backup RAM, of the ECU 30, and the procedure ends.

Besides, at a time when it is determined that abnormality exists, the energization OFF signal is outputted to the EDU 31 from the ECU 30, the switching element of the EDU 31 is turned off compulsorily, and the output current (motor current) of the EDU 31 is intercepted.

A control process of the present embodiment will be described hereinafter based on time charts shown in FIG. 10.

Figure 10:
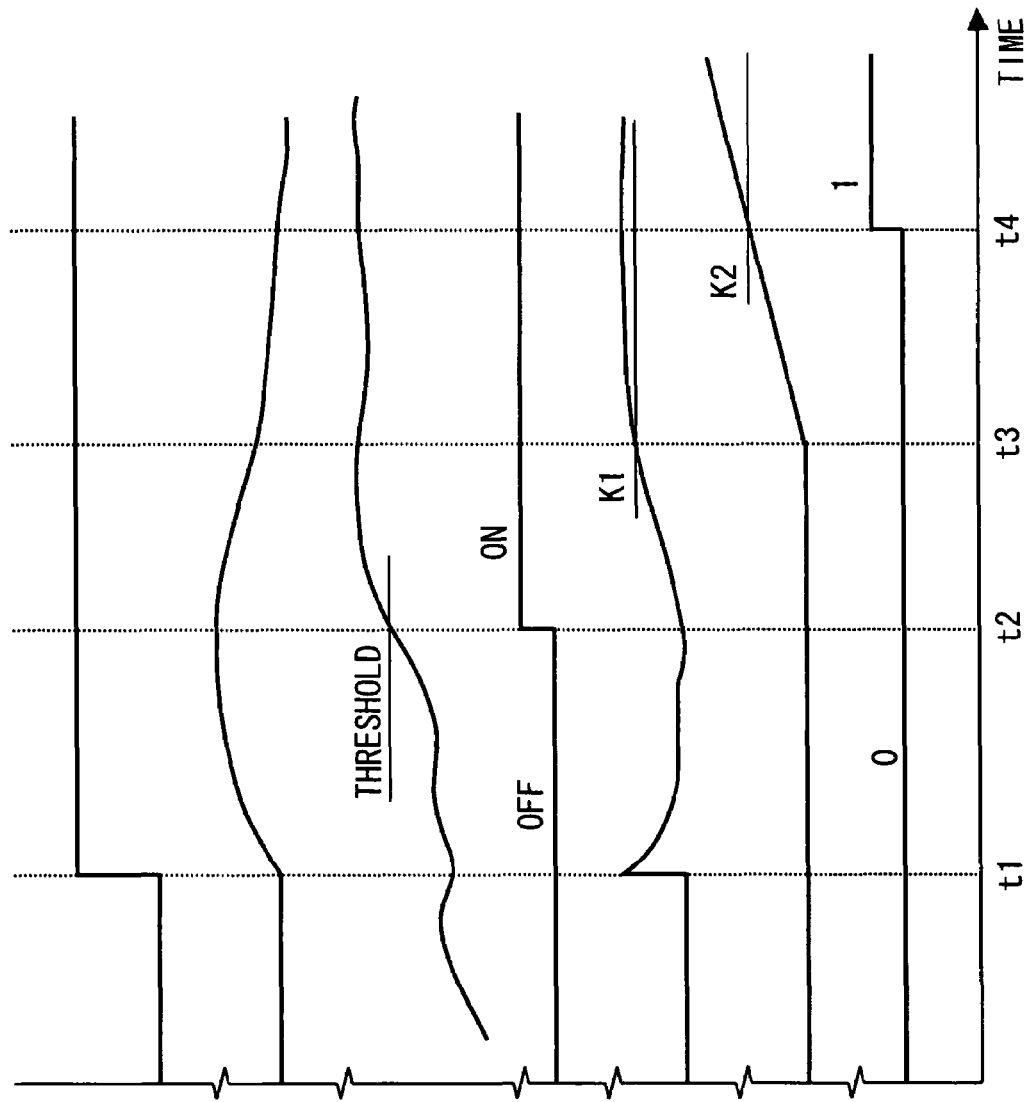
FIG. 10 is a time chart for explaining a control of the embodiment.

In FIG. 10, at time t1, the target camshaft phase stepwise changes, and the actual camshaft phase begins to change in such a manner as to follow it. Then, when estimated motor current exceeds a threshold at time t2, the guard process to the motor speed F/B amount is started, and the motor speed F/B amount is restricted with the upper limit guard value and the lower limit guard value. Thereby, the variation (motor speed F/B amount) in target motor speed outputted to EDU 31 is restricted, and the motor current is restricted.

At a time t3 in which the deviation exceeds the specified value K1, the counter t starts to count the time period where the deviation exceeds the specified value K1.

Then, when the time period counted by the counter t exceeds the specified value K2 at a time t4, the abnormality flag is turned to "1", which indicates that abnormality exists.

According to present embodiment, the motor current is estimated based on the target motor speed, the actual motor speed, and the engine speed. When the estimated motor current exceeds a predetermined value equivalent to the heat limiting current value, the variation (motor speed F/B amount) of the target motor speed outputted to the EDU 31 from the ECU 30 is restricted so that the motor current was restricted Hence, the heat value of motor 26 may not exceed the heat generation limit, and it can be prevented that the coil temperature of motor 26 exceeds the allowable temperature range. The durability deterioration and failure of motor 26 can be prevented.

When performing abnormality diagnosis of variable valve timing controller 18 during motor current restriction processing, the existence of the abnormalities of variable valve timing controller 18 is determined based on the deviation of the target camshaft phase and the actual camshaft phase, considering a deterioration of responsivity of the variable valve timing control due to restriction of the motor current. Therefore, the abnormality diagnosis of variable valve timing controller 18 can be performed with sufficient accuracy during execution of motor current restriction processing, and the abnormality can be detected at an early stage.

In the present invention, the duty of the voltage applied to motor 26 is estimated as the information of the motor current, and when the estimated duty exceeds the predetermined value, the variation (motor speed F/B correction amount) in the target motor speed which is outputted to the EDU 31 from the ECU 30 is restricted, whereby the output current (motor current) of the EDU 31 is restricted. The duty estimation can be performed using the same map as FIG. 9.

Besides, the present invention is not limited to the variable valve timing controller of the intake valve, but may be applied to the variable valve timing controller of the exhaust valve. Furthermore, the phase variable mechanism of the variable valve timing device 18 is not limited to the planetary gear mechanism. Other mechanisms are employable when the valve timing is changed by varying the rotational speed of the motor relative to the rotational speed of the camshaft.

What is claimed is:

1. A variable valve timing controller adjusting a valve timing of an intake valve and/or an exhaust valve by varying a speed of an electric motor relative to a rotational speed of a camshaft in such a manner as to vary a camshaft phase representing a rotational phase of the camshaft relative to a crankshaft of an internal combustion engine, the variable valve timing controller comprising:
   a target motor speed computing means for computing a target motor speed based on a rotation speed of the internal combustion engine and a deviation between a target camshaft phase and an actual camshaft phase;
   a motor drive control means for feedback controlling a motor current representing a driving current of the motor in such a manner as to decrease a deviation between the target motor speed and an actual motor speed;
   a motor current estimating means for estimating the motor current;
   a motor current restricting means for restricting the motor current when the motor current estimated by the motor current estimating means exceeds a predetermined value; and
   an abnormality-diagnosis means for determining whether an abnormality exists based on a deviation between the target camshaft phase and the actual camshaft phase in consideration of a deterioration of responsivity of the variable valve timing control due to a restriction of the motor current by the motor current restricting means.

2. A variable valve timing controller according to claim 1, further comprising a warning means for warning a passenger when it is determined that an abnormality exists by the abnormality-diagnosis means.

3. A variable valve timing controller according to claim 1, wherein the motor current estimating means estimates the motor current based on at least the target motor speed and the actual motor speed.

4. A variable valve timing controller according to claim 3, wherein the motor current estimating means estimates the motor current based on at least the target motor speed, the actual motor speed, and the rotation speed of the internal combustion engine.

5. A variable valve timing controller according to claim 1, wherein the motor current restricting means restricts the motor current by restricting a variation in target motor speed when the estimated motor current exceeds the predetermined value.

6. A variable valve timing controller according to claim 5, wherein the target motor speed computing means computes a motor speed correction amount based on the rotation speed of the internal combustion engine and the deviation between the target camshaft phase and the actual camshaft phase, and computes the target motor speed by correcting a base target motor speed, which corresponds to a rotation speed of the camshaft, and
   the motor current restricting means restricts the variation in target motor speed by restricting the motor speed correction amount when the estimated motor current exceeds the predetermined value.

7. A variable valve timing controller according to claim 6, wherein the motor current restricting means varies a restricting range of the motor speed correction amount according to the rotation speed of the internal combustion engine.

8. A variable valve timing controller according to claim 1, wherein the motor drive control means controls the motor current by varying a duty ratio of voltage applied to the motor, the motor current estimating means estimates the duty ratio as information of the motor current, and the motor current restricting means restricts the motor current when the duty ratio estimated by the motor current estimating means exceeds the predetermined value.

9. A variable valve timing controller adjusting a valve timing of an intake valve and/or an exhaust valve by varying a speed of an electric motor relative to a rotational speed of a camshaft in such a manner as to vary a camshaft phase representing a rotational phase of the camshaft relative to a crankshaft of an internal combustion engine, the variable valve timing controller comprising:

a target motor speed computer which computes a target motor speed based on a rotation speed of the internal combustion engine and a deviation between a target camshaft phase and an actual camshaft phase;

a motor drive controller which feedback-controls a motor current representing a driving current of the motor in such a manner as to decrease a deviation between the target motor speed and an actual motor speed;

a motor current estimator which estimates the motor current;

a motor current restrictor which restricts the motor current when the motor current estimated by the motor current estimator exceeds a predetermined value; and an abnormality-diagnosis unit which determines whether an abnormality exists based on a deviation between the target camshaft phase and the actual camshaft phase in consideration of a deterioration of responsivity of the variable valve timing control due to a restriction of the motor current by the motor current restrictor.

* * * * *